United States Patent [19]

Matsubayashi

[11] Patent Number: 5,132,953
[45] Date of Patent: Jul. 21, 1992

[54] MULTI-BEAM OPTICAL RECORDING/REPRODUCING APPARATUS FOR RECORDING/REPRODUCING ON A MEDIUM HAVING A RECORDING FLAT PART WITH A GUIDE GROOVE ON EACH SIDE

[75] Inventor: Nobuhide Matsubayashi, Hachioji, Japan

[73] Assignee: Olympus Optical Co., Ltd., Tokyo, Japan

[21] Appl. No.: 597,271

[22] Filed: Oct. 15, 1990

Related U.S. Application Data

[63] Continuation of Ser. No. 294,972, Jan. 4, 1989, abandoned, which is a continuation of Ser. No. 876,571, Jun. 20, 1986, abandoned.

[30] Foreign Application Priority Data

Jun. 21, 1985 [JP] Japan .................. 60-135606

[51] Int. Cl.⁵ .......................... G11B 7/00
[52] U.S. Cl. ................ 369/44.37; 369/44.26; 369/44.11; 369/110; 369/112; 369/275.1; 369/275.3
[58] Field of Search ........... 369/106, 109, 112, 44.26, 369/44.37, 44.11, 13, 275.1, 277, 44.38, 275.3, 275.4, 100, 110, 111

[56] References Cited

U.S. PATENT DOCUMENTS

| | | | |
|---|---|---|---|
| 4,238,843 | 12/1980 | Carasso et al. | 365/234 |
| 4,385,303 | 5/1983 | Akahira et al. | 369/275 X |
| 4,451,863 | 5/1984 | Yanagida et al. | 360/114 |
| 4,507,763 | 3/1985 | Kato | 369/44 |
| 4,587,648 | 5/1986 | Ando | 369/275 |
| 4,689,781 | 8/1987 | Ando | 369/112 |

FOREIGN PATENT DOCUMENTS

| | | | |
|---|---|---|---|
| 0178116 | 4/1986 | European Pat. Off. | 269/275 |
| 2321164 | 3/1977 | France | 369/109 |
| 51-107121 | 9/1976 | Japan . | |
| 58-41446 | 3/1983 | Japan | 369/109 |
| 58-102338 | 6/1983 | Japan | 369/275 |
| 58-102347 | 6/1983 | Japan | 369/275 |
| 59-38939 | 3/1984 | Japan | 369/275 |
| 59-177744 | 10/1984 | Japan | 369/277 |
| 60-239949 | 11/1985 | Japan | 369/275 |
| 2036410 | 6/1980 | United Kingdom | 369/275 |

Primary Examiner—Roy N. Envall, Jr.
Assistant Examiner—Robert Chevalier
Attorney, Agent, or Firm—Armstrong & Kubovcik

[57] ABSTRACT

An optical recording/reproducing apparatus wherein a main beam is converged and projected onto a flat part between tracking guide groove parts adjacent to each other in an optical recording medium to record, reproduce or erase information, two sub-beams on both sides of the main beam are respectively converged and projected so as to cover the guide groove parts to form a tracking system for controlling tracking and one of the two sub-beams is utilized to discriminate the flat part.

9 Claims, 4 Drawing Sheets

MULTI-BEAM OPTICAL RECORDING/REPRODUCING APPARATUS FOR RECORDING/REPRODUCING ON A MEDIUM HAVING A RECORDING FLAT PART WITH A GUIDE GROOVE ON EACH SIDE

This application is a continuation of application Ser. No. 294,972 filed Jan. 4, 1989 now abandoned, which is a continuation of application Ser. No. 876,571 filed Jun. 20, 1986 now abandoned.

FIELD OF THE INVENTION AND RELATED ART STATEMENT

This invention relates to an optical recording/reproducing apparatus wherein information is recorded in a flat part between tracking guide grooves adjacent to each other.

Recently, there has come to be noted an optical information recording/reproducing apparatus wherein information can be recorded at a high density by using light beams or information recorded at a high density can be reproduced at a high speed instead of an apparatus for recording/reproducing information by using a magnetic head.

An optical apparatus of a photomagnetic system wherein both recording and reproducing can be made is being noted to be likely in the future to replace the floppy disc apparatus or hard disc apparatus.

Now, in case information is to be recorded in an optical recording medium in the above mentioned photomagnetic system, concavoconvex groove parts 2 for tracking and prepit parts 3 to be index signals are made in advance on a recording medium 1 as shown in FIG. 1. The above mentioned groove parts 2 and prepit parts 3 are made by copying the signals of a stamper on the surface of a base plate of plastic or glass by an injection molding or 2-P method (wherein a liquid photosetting resin is applied to paint a stamper, is irradiated with a light to be set and is transferred).

In the conventional apparatus, a beam is tracked on the groove or prepit part 3 by a push-pull method to read out index signals and signals are recorded, reproduced or erased in the groove part.

As shown in the above mentioned FIG. 1, the prepit part normally has a pit depth of λ/4 so that the modulation degree may be maximum but, on the other hand, the groove part 2 is so formed as to be of a depth of λ/8 at which the strength of the push-pull signal will be maximum.

Now, the stamper for forming the above mentioned groove part 2 or prepit part 3 is made by painting a glass original plate with a photoresistor and irradiating and exposing it with a laser light.

When the recording medium in the above mentioned conventional apparatus is used, the width, depth or shape of the groove will become nonuniform under the influence of the sway or the like of the laser light. The groove of the groove part 2 will not be step-shaped, deep and square in the side wall as shown in FIG. 1 but will be a smoothly inclined deeply trapezoidal groove as shown in FIG. 2 and therefore, under the influence of the flatness of the inclined wall surface or the bottom part of the groove, the reflection factor will fluctuate, the polarizing surface will be also likely to fluctuate, noise components will increase and the S/N or C/N in the case of reproduction will be remarkably reduced.

Also, the flat part of the groove is so narrow that the light amount of the reflected light refracted and returning to the objective lens will decrease and the signal component will become small. This fact also has a great influence on the deterioratio of the S/N or C/N of the reproduction.

The difference between the depths of the groove part 2 and prepit part 3 complicates the production process of the above mentioned recording medium.

OBJECTS AND SUMMARY OF THE INVENTION

An object of the present invention is to provide an optical recording/reproducing apparatus which can make a recording wherein the S/N or C/N in the case of reproduction can be made large.

Another object of the present invention is to provide an optical recording/reproducing apparatus which is easy to make and can be made low in the cost.

According to the present invention, a recording medium wherein a tracking guide groove part is formed to trace a light beam, the flat part between the guide groove parts adjacent to each other is made an information recording region and an indexing part for discriminating the flat part is provided along the above mentioned guide groove part in the boundary part of each sectioned flat part is used so that a central main beam of three light beams may be converged and projected onto the above mentioned flat part to record, reproduce or erase information and the sub-beams on both sides of the main beam may be converged and projected onto the above mentioned guide groove part to control the tracking and to discriminate the flat part.

BRIEF DESCRIPTION OF THE DRAWINGS

FIGS. 3a to 5 relate to the first embodiment of the present invention.

FIG. 3, consisting of 3a–3c, show an optical recording medium used in the first embodiment.

FIG. 3a is a plan view.

FIG. 3b is a sectioned view on line A—A' in FIG. 3a.

FIG. 3c is a sectioned view on line B—B' in FIG. 3a.

FIG. 4 is a perspective view showing the optical recording medium as cut off.

FIG. 5 is a schematic diagram showing the optical system of the optical recording/reproducing apparatus of the first embodiment.

DETAILED DESCRIPTION OF PREFERRED EMBODIMENTS

The (optical) recording medium 12 used in the optical recording/reproducing apparatus 11 of the first embodiment is of such formation as is shown in FIG. 3.

The recording medium 12 is disc-shaped and has prepit parts 14 having recesses and projections according to index signals formed therein and a groove part 15 to be a tracking guide groove both formed along a concentric or spiral recording track on one or both recording surfaces.

Figure 1:
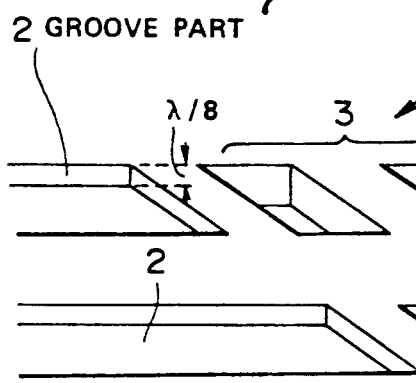
FIG. 1 is a schematic perspective view showing an optical recording medium in a prior art.
Figure 2:
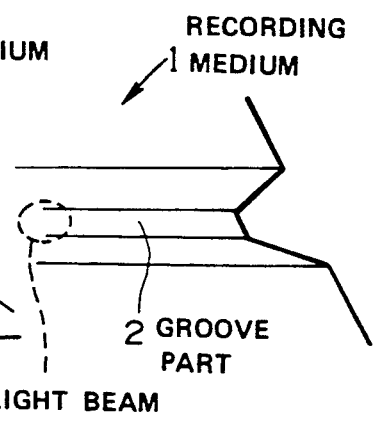
FIG. 2 is a perspective view showing that the wall surface of the groove part is sloped.
Figure 3A:
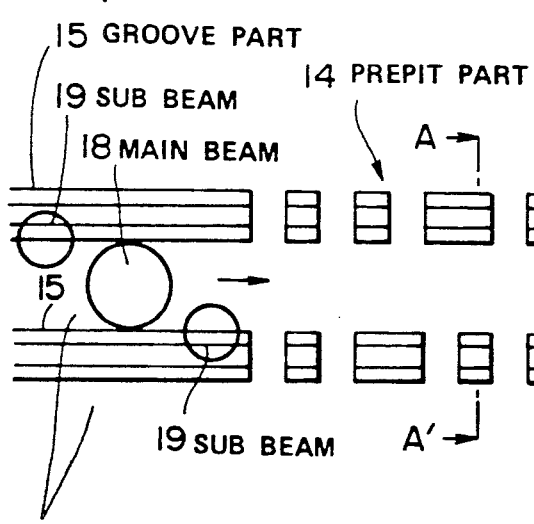
Figures 3B, 3C:
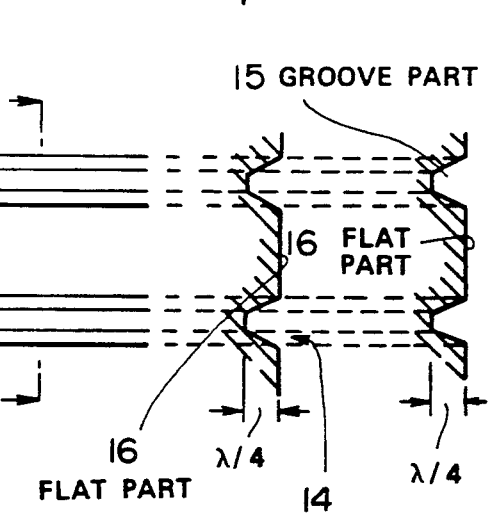
Figure 4:
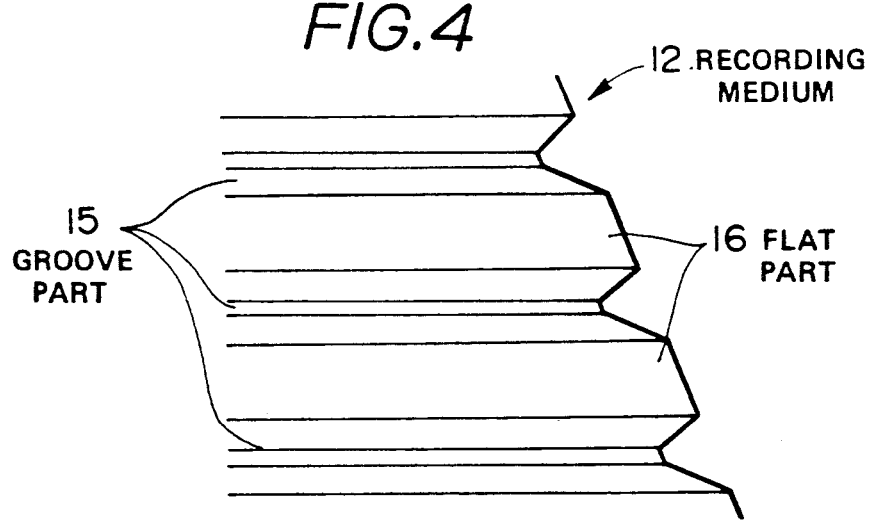

Both of the above mentioned prepit part 14 and groove part 15 are of a groove depth of λ/4 of the light to be used (See FIGS. 3b and 3c). As shown in FIG. 4, a flat part 16 is formed between the groove parts 15 adjacent to each other and is to be an information data recording part onto which a main beam 18 will be projected in the form of a spot in case information is recorded or reproduced in a three-beam system. Such sub-beams 19, 19 will then be projected onto both groove parts 15, 15 on both sides of this flat part 16. By the way, each sub-beam 19 is to be projected so that the center of the beam may be located in the boundary between each groove part 15 and flat part 16. The prepit part 14 has discriminating codes respectively representing the indices of the flat part 16 on one adjacent side (for example, on the right or left side with respect to the light beam running direction).

Figure 5:
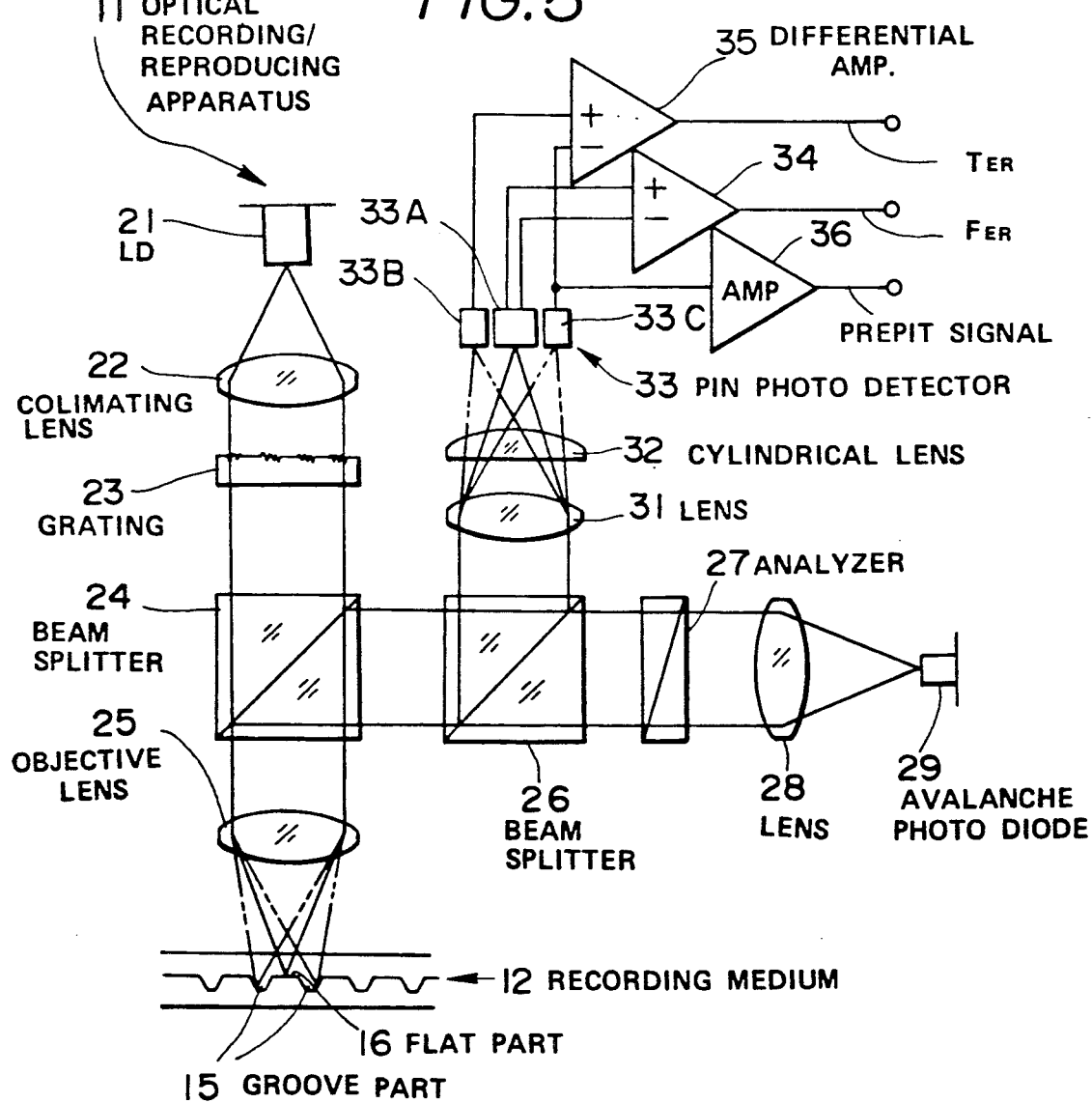

The optical system of the optical recording/reproducing apparatus 11 of the photomagnetic system of the first embodiment using the above mentioned recording medium 12 is of such formation as is shown in FIG. 5.

A laser light of a single wavelength emitted from a laser diode LD is made a parallel light beam by a collimating lens 22 and is separated in the angle by a grating 23 into a main beam to be a zero-order refracted light beam and two sub-beams which are ±1-order refracted light beams and the beams then enter a beam splitter 24.

The light beams having entered and passed through the above mentioned beam splitter 24 are converged onto the recording medium 12 by an objective lens 25 and are projected as spot light beams. In this case, of the spot light beams on the recording medium 12 of the photomagnetic system, as shown in FIG. 3a, the main beam 18 will be projected onto the flat part 16 between the two groove parts 15, 15 and the two sub-beams 19, 19 will be projected so that about half of each beam will cover each of the two groove parts 15, 15 adjacent to the main beam 18.

The light reflected by the above mentioned recording medium 12 and having passed through the objective lens enters the beam splitter 24. The light reflected by this beam splitter 24 is divided by the next beam splitter 26. One of the divided light beams passes through the beam splitter 26, further passes through a light analyzer 27, is then converged by a lens 28 and enters an avalanche photodiode 29. The above mentioned light analyzer 27 has its arranging angle set so as to be able to detect the rotation of a minute angle of the polarizing surface of the reflected light in response to the magnetizing direction of the part in the recording medium onto which the main beam 18 is projected. Therefore, the light beam in response to the information recorded in the flat part 16 by the main beam 18 enters the photodiode 29 and the output of this photodiode 29 becomes a signal reproducing the recorded information (in the case of a reproducing mode). By the way, the sub-beams 19, 19 having passed through the beam splitter 26 are converged at both side ends of the photodiode 29, therefore do not enter the photodiode 29 and have no influence on the photomagnetic recorded information. In the case of a recording mode, the flat part 16 in which a strong magnetic film is formed by the main beam 18 is locally heated to warm the irradiated part to be substantially above the phase shifting point, the magnetization is turned in a bias magnetic field direction not illustrated and recording is made.

On the other hand, the light beam reflected by the above mentioned beam splitter 26 passes through a light converging lens 31 and cylindrical lens 32 and enters a six-part divided pin photodetector 33. In this case, the main beam will enter a central four-part divided photodetector 33A and a focus error signal $F_{ER}$ will be output from a differential amplifier 34, for example, by an astigmatism method, the two sub-beams will be received respectively by photodetectors 33B and 33C on both sides and a tracking error signal $T_{ER}$ will be taken out by a differential output passed through a differential amplifier 35. Also, in this case, as about half of each sub-beam projected onto the recording medium 12 covers the groove part 15 as described above, in case the prepit part 14 is covered by the sub-beam, the sub-beam will be modulated in response to the recesses and projections of the prepit part 14. Therefore, the output of the photodetector (33C in the illustration) receiving one of the two sub-beams is passed through the amplifier 36 to read out an index signal (prepit signal).

The above mentioned focus error signal $F_{ER}$ and tracking error signal $T_{ER}$ are impressed on a lens actuator respectively through a phase compensating circuit and driving circuit not illustrated and the objective lens 25 is finely moved to be held in a focus state and in a tracking state tracing the predetermined flat part.

When this first embodiment is used, the information of the photomagnetic system will be able to be recorded in the flat part 16 high in the flatness between the adjacent groove parts instead of on the groove parts in the prior art, therefore the reflection factor will little fluctuate, the slope of the wall surface of the groove part 15 will have little influence, thus the noises will reduce, the substantial recording area will be able to be made large and the S/N in the case of reproduction will remarkably improve. Further, as compared with the apparatus of the conventional system wherein the groove part is traced with a one-beam system, it has been able to be confirmed that, though the modulation degree of the signal of the prepit part 14 reduces, if the pit depth of the prepit part 14 is made ¼ the wavelength of the laser light and more than half the sub-beam is made to cover the groove part 15 at some sacrifice of the tracking error modulating degree, the S/N of the signal of the prepit part 14 will be able to be sufficiently taken.

Also, there are advantages that, when the three-beam method is used for tracking, the depth of the groove of the groove part 15 will be able to be of a value of λ/4 from the conventional value of λ/8, therefore the depth of the groove will not be required to be changed in the prepit part 14 and groove part 15, the number of the production steps will be able to be reduced and, even if the precision of the depth of the groove is lower than in the same case of λ/8, it will be practical enough.

Further, there will be no influence of the offset and inclination produced in tracking by the push-pull method and accurate tracking will be possible.

Figure 6:
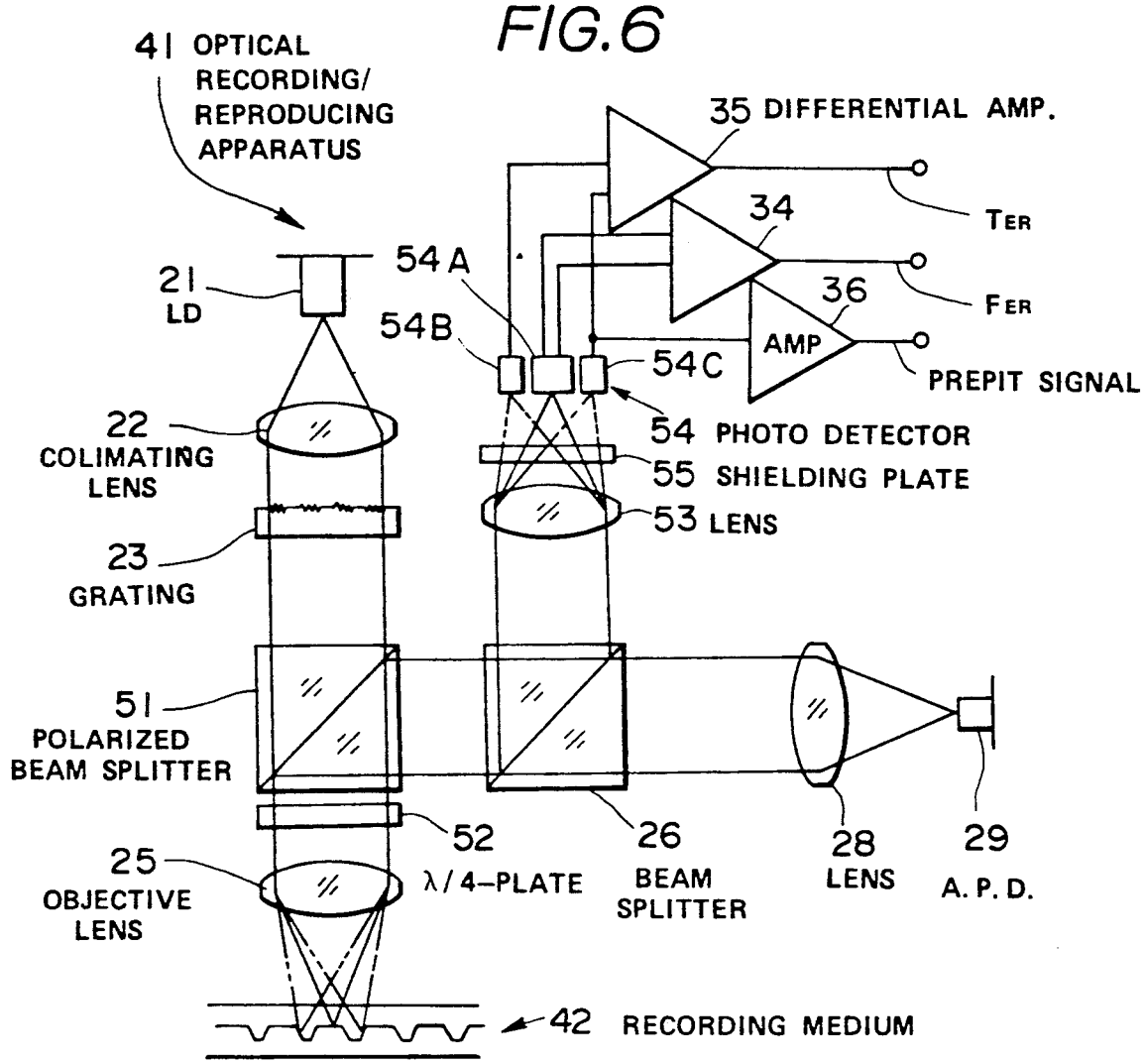
FIG. 6 is a formation view showing the optical system of the optical recording/reproducing apparatus of the second embodiment of the present invention.
Figure 8:
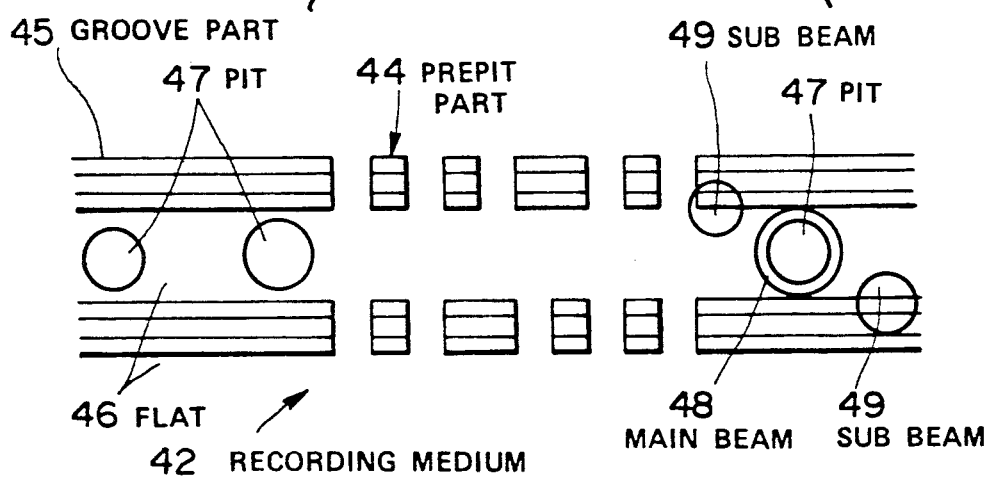
FIG. 8 is a plan view showing the optical recording medium used in the second embodiment.

The optical recording/reproducing apparatus of the second embodiment shown in FIG. 6 shows the case of a photodisc apparatus system forming pits in a recording medium 42. That is to say, as shown in FIG. 8, a prepit part 44 and groove part 45 are formed on the recording medium 42 the same as in the recording medium 12 in the first embodiment and the information to be recorded in the case of the recording mode is formed as pits 47 in the flat part 46. In the case of the reproducing mode, the information by the pits 47 recorded in the flat part 46 will be read out by the three-beam method.

In the apparatus for recording/reproducing information into/out of the above mentioned recording medium 42 shown in FIG. 6, for example, a P-polarized light beam having passed through the grating 23 is passed through a polarized beam splitter 51, is made a circularly polarized beam by a λ/4-plate 52 arranged between the polarized beam splitter 51 and objective lens 25 and is projected onto the recording medium 42. In this case, the main beam 48 will be projected onto the flat part 46 and each sub-beam 49 will be projected to cover the flat part 46 and each groove part 45.

Figure 7:
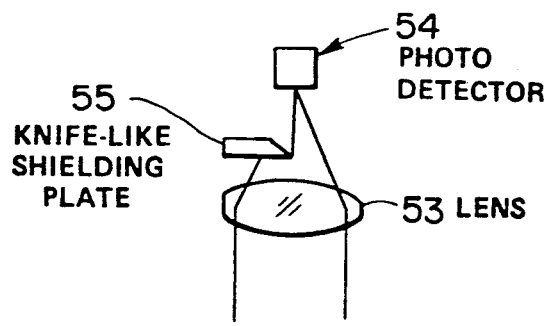
FIG. 7 is a side view showing a knife-edged shielding plate as seen from the direction of the side part.

The light reflected by the recording medium 42 passes through the objective lens 25, is S-polarized by the λ/4-plate 52 and enters the polarized beam splitter 51. The light beam reflected by this polarized beam splitter 51 is branced by the beam splitter 26 and the passing light beam is coverged by the lens 28 and is received by the photodiode 29. The light beam reflected by the beam splitter 26 is converged by a light converging lens 53 and enters a four-part divided photodetector 54. By the way, as shown in FIGS. 6 and 7, a knife-edged shielding plate 55 is arranged in front of the above mentioned light converging lens 53. The light beam shielded by this shielding plate 55 is received by a two-part divided detector 54A and its differential output is taken out by the differential amplifier 34 so that the focus error signal $F_{ER}$ by the knife-edge method may be obtained.

Photodetectors 54B and 54C on both sides of the above mentioned two-part divided detector 54A receive the ±1-order refracted light and a tracking error signal $T_{ER}$ can be obtained by the differential amplifier 35. The signal having passed through one detector 54C is passed through the amplifier 36 so that a prepit signal may be obtained.

The others are substantially the same as in the above mentioned first embodiment. As compared with the prior art wherein pits are formed within the groove part, even in this second embodiment, a reproduced signal high in S/N can be obtained by being little influenced by the slope form of the groove wall surface.

Figure 9:
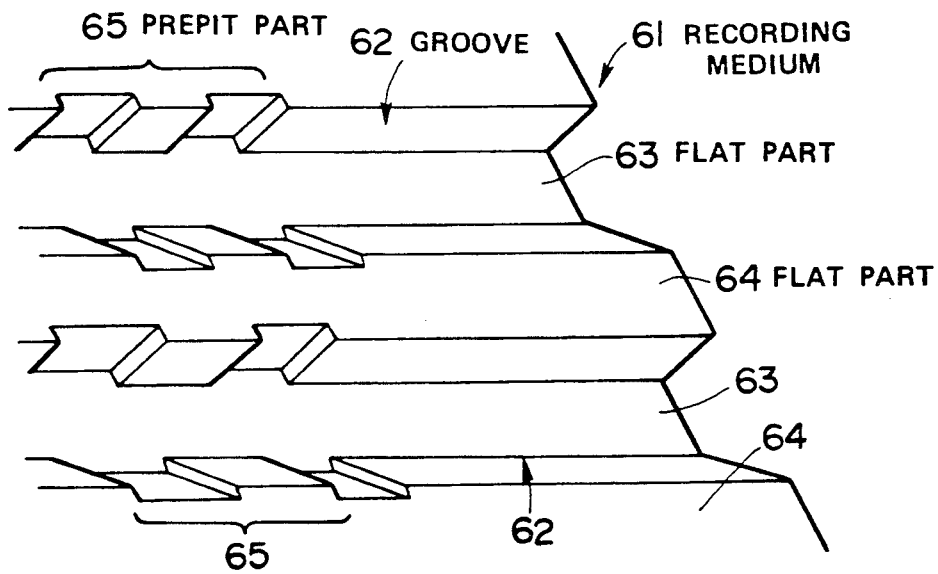
FIG. 9 is a plan view showing another embodiment of the optical recording medium.
Figure 10:
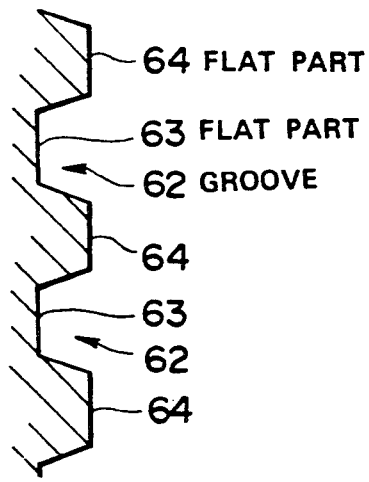
FIG. 10 is a sectioned view of FIG. 9.

FIGS. 9 and 10 show another embodiment of the recording medium of the photomagnetic system.

In this recording medium 61, the groove part 62 is made wider and a flat part 63 is formed also within the groove part 62. As in the above mentioned first embodiment, information data are recorded by using the part of the flat part 64 before the formation of the groove part 62 and the flat part 63 within the groove part 62. The prepit part 65 is formed in the boundary part of the flat part 64 and groove part 62, for example, by incising the flat part 64.

Therefore, the main beam is projected onto the flat part 63 or 64 and the sub-beams are projected onto the slope parts on both sides of the flat part so that information data may be recorded in the flat part 63 or 64 or recorded information data may be reproduced.

When this recording medium 61 is used, the efficiency of utilizing the flat part will be able to be elevated and the recording medium will be adapted to high density recording.

By the way, this recording medium 61 can be utilized not only for the photomagnetic system but also for the photodisc device and the like.

In the present invention, for example, the knife-edge method is used in the first embodiment, the astigmatism method is used in the second embodiment or any other known method can be also used.

Also, for example, a known differential system is used for the photomagnetic system and thus the system and shape in the optical recording/reproducing apparatus are not limited.

By the way, the present invention can be extensively utilized in optically recording, reproducing or erasing information by using light beams.

In each of the above mentioned embodiments, the reflected light of the light beam projected onto the recording medium is received by the photodetector but the passing light may be led to the photodector.

As described above, according to the present invention, information data can be recorded in the flat part between the grooves and therefore the S/N of recording/reproduction can be greatly improved. Further, by making the depths of the grooves of the prepit part and groove part equal to each other, the number of the production steps and the cost can be reduced.

It is apparent that a working mode different in a wide range can be formed without departing from the spirit and scope of the present invention. The present invention is not restricted to any specific working mode except being limited in the appended claims.

What is claimed is:

1. A multibeam optical recording/reproducing apparatus, comprising:
   (a) a plurality of guide groove parts formed for tracking,
   (b) a flat part formed between adjacent guide groove parts, wherein said flat part has a characteristic of rotating a polarization plane of reflected light from said flat part according to a direction of magnetization of a portion of the flat part onto which a light beam is to be projected, and wherein information to be recorded and reproduced is recorded on said flat part, and
   (c) an index part, having at least a prepit part, corresponding to one of said guide groove parts, to discriminate track numbers and sector numbers of recording regions, wherein said prepit part and a corresponding one of said guide groove parts are in line with one another, and further wherein the guide groove part and the index part have the same groove depth;
   a beam producing means for producing a main beam and sub-beams formed as separate beams on both sides of said main beam;
   an optical means for converging and projecting said main beam onto said flat part of the recording medium, for respectively converging and projecting said sub-beams onto adjacent guide groove parts on both sides of said flat part receiving said main beam, and for transmitting reflected or passing light beams of the main beam and sub-beams from said recording medium to a photodetector;
   a signal processing means for producing a controlling signal by both sub-beams from a signal photoelectrically converted by said photodetector, a recording region discriminating signal from one of the sub-beams and a reproduced signal by the main beam; and
   an actuator means for actuating a tracking servo-mechanism and focusing servo-mechanism of said optical means in response to said controlling signal.

2. The multibeam optical recording/reproducing apparatus of claim 1 wherein said beam producing means includes means for passing a light beam of a single wavelength through a grating to produce a main beam with a zero-order refracted light and to produce sub-beams with a ±1-order refracted light.

3. The multibeam optical recording/reproducing apparatus of claim 1 wherein the depth of the groove of said guide groove part of said recording medium and the depth of the index part for discriminating recording regions are made substantially λ/4 the light beam used.

4. The multibeam optical recording/reproducing apparatus of claim 1 wherein said flat part of said recording medium is of a photodisc system in which a pit is formed by projecting a light beam of high energy intensity.

5. The multibeam optical recording/reproducing apparatus of claim 1 wherein said flat part of said recording medium is of a photomagnetic system in which a strong magnetic film warmed to be substantially above the phase shifting point is formed by projecting a light beam of high energy density.

6. The multibeam optical recording/reproducing apparatus of claim 1 wherein said optical means has a focus detecting optical system using an astigmatism method.

7. The multibeam optical recording/reproducing apparatus of claim 1 wherein said optical means has a focus detecting optical system using a knife-edge method.

8. The multibeam optical recording/reproducing apparatus of claim 1 wherein said index part is formed in a sidewall of the guide groove part for tracking and a bottom surface of said guide groove part is also provided for recording/reproducing information.

9. A multibeam optical recording/reproducing method wherein, in a recording medium comprising a plurality of groove parts formed for tracking, a flat part formed between said guide groove parts adjacent to each other to optically record information, and a recording region discriminating index part formed along the above mentioned guide groove part in the boundary region part of said flat part wherein said index part includes a prepit part for discriminating track numbers or sector numbers, and wherein said prepit part and said guide groove parts have the same groove depth, said method comprising the steps of:

converging and projecting a central main beam (among three beams is converged and projected) onto said flat part to at least optically record, reproduce or erase information; and simultaneously respectively converging and projecting sub-beams on both sides of said main beam to cover said guide groove parts to form a tracking controlling system so that, when both sub-beams are respectively converged and projected onto said index part, said flat part will be discriminated with one of both sub-beams.

* * * * *